(12) United States Patent
Kokes et al.

(10) Patent No.: US 12,130,033 B2
(45) Date of Patent: Oct. 29, 2024

(54) CEILING-MOUNTED AIR CONDITIONING UNIT FOR A HEAT PUMP COMPRISING A REFRIGERANT CIRCUIT WITH A REFRIGERANT LEAKAGE SENSOR

(71) Applicants: DAIKIN INDUSTRIES, LTD., Osaka (JP); DAIKIN EUROPE N.V., Ostend (BE)

(72) Inventors: Lukas Kokes, Plzen (CZ); Adela Zdvoranova, Plzen (CZ); Tomas Srail, Plzen (CZ)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 239 days.

(21) Appl. No.: 17/903,685

(22) Filed: Sep. 6, 2022

(65) Prior Publication Data
US 2022/0412591 A1 Dec. 29, 2022

Related U.S. Application Data

(63) Continuation of application No. PCT/JP2021/016412, filed on Apr. 23, 2021.

(30) Foreign Application Priority Data

Apr. 24, 2020 (EP) .................................... 20171304

(51) Int. Cl.
*F24F 11/36* (2018.01)
*F24F 1/00* (2019.01)
(Continued)

(52) U.S. Cl.
CPC ............ *F24F 11/36* (2018.01); *F24F 1/0047* (2019.02); *F24F 13/22* (2013.01); *F25B 49/005* (2013.01); *F25B 2500/222* (2013.01)

(58) Field of Classification Search
CPC ........ F24F 11/36; F24F 1/0047; F24F 1/0067; F24F 13/22; F25B 2500/222; F25B 49/005
See application file for complete search history.

(56) References Cited

U.S. PATENT DOCUMENTS

2017/0314805 A1   11/2017   Ikawa et al.
2021/0041114 A1*  2/2021   Watanabe ............. F24F 1/0063
(Continued)

FOREIGN PATENT DOCUMENTS

EP          2813777 A1     12/2014
EP          3279590 A1     2/2018
(Continued)

OTHER PUBLICATIONS

International Search Report issued in corresponding International Application No. PCT/JP2021/016412 mailed Aug. 2, 2021 (4 pages).
(Continued)

*Primary Examiner* — Marc E Norman
(74) *Attorney, Agent, or Firm* — Osha Bergman Watanabe & Burton LLP

(57) ABSTRACT

A ceiling-mounted air conditioning indoor unit for a heat pump including a refrigerant circuit, the ceiling-mounted air conditioning indoor unit includes: a casing including an air inlet and an air outlet; a drain pan in a bottom portion of the casing; a heat exchanger in the refrigerant circuit that is disposed above the drain pan such that water dropping from the heat exchanger accumulates in the drain pan; a fan in the casing that draws air in from the air inlet, through the heat exchanger, and out of the air outlet; a bell mouth at the air inlet that guides the air drawn-in to the fan; a refrigerant leakage detection sensor that detects refrigerant leaking from the refrigerant circuit. The drain pan includes a first rim and a second rim.

14 Claims, 6 Drawing Sheets

(51) Int. Cl.
  *F24F 1/0047*    (2019.01)
  *F24F 13/00*     (2006.01)
  *F24F 13/22*     (2006.01)
  *F25B 49/00*     (2006.01)

(56) References Cited

U.S. PATENT DOCUMENTS

2022/0128281 A1* 4/2022 Tsuji ................. F24F 11/30
2022/0243952 A1* 8/2022 Kojima .............. F24F 13/22
2022/0260259 A1* 8/2022 Minami ............. F24F 1/0057

FOREIGN PATENT DOCUMENTS

| JP | 2004-85003  | A  | 3/2004  |
|----|-------------|----|---------|
| JP | 3587326     | B2 | 11/2004 |
| JP | 2008-64394  | A  | 3/2008  |
| JP | 2012-77952  | A  | 4/2012  |
| JP | 2016-84946  | A  | 5/2016  |
| JP | 2016-90107  | A  | 5/2016  |
| JP | 2017-15324  | A  | 1/2017  |
| JP | 2019-60517  | A  | 4/2019  |

OTHER PUBLICATIONS

Extended European Search Report issued in corresponding European Application No. 20171304.7 mailed Oct. 26, 2020 (7 pages).
International Preliminary Report on Patentability issued in corresponding International Application No. PCT/JP2021/016412 mailed Nov. 3, 2022 (8 pages).

* cited by examiner

CEILING-MOUNTED AIR CONDITIONING UNIT FOR A HEAT PUMP COMPRISING A REFRIGERANT CIRCUIT WITH A REFRIGERANT LEAKAGE SENSOR

CROSS-REFERENCE TO RELATED APPLICATIONS

This is a continuation application of International Patent Application No. PCT/JP2021/016412, filed on Apr. 23, 2021, and claims priority to European Patent Application No. 20171304.7, filed on Apr. 24, 2020. The contents of these priority applications are incorporated herein by reference.

TECHNICAL FIELD

The present disclosure relates to a ceiling-mounted air conditioning unit for a heat pump comprising a refrigerant circuit.

BACKGROUND

As described in EP 3 279 590 A1, conventionally, in an air-conditioning apparatus having a ceiling-mounted indoor unit that uses a refrigerant having a greater specific gravity when gasified than air, an intake port and a blow-out port are formed in the indoor unit, the indoor unit having an indoor fan for drawing indoor air in from the intake port and blowing conditioned air out from the blow-out port, an intake temperature sensor, an indoor-side refrigerant circuit for circulating the refrigerant and producing conditioned air from the indoor air, and a refrigerant temperature sensor for detecting the temperature of the refrigerant in the indoor-side refrigerant circuit. A control device drives the indoor fan in accordance with an operation mode and/or a detection value of the refrigerant temperature sensor and detects refrigerant leakage through the use of a refrigerant gas sensor.

In EP 3 279 590 A1, the refrigerant gas sensor is provided in an air flow path inside the indoor unit. The describes refrigerant gas sensor uses the air, including leaked refrigerant, drawn in from the room. More specific, in the described indoor unit the refrigerant, which has a greater specific gravity when gasified than air, accumulates in a bottom part of a space in the room, hence, a refrigerant leakage can not be detected reliable without operating the indoor fan. This is mainly caused by the position of the refrigerant gas sensor, namely on the outer surface of the bell mouth. As the refrigerant leakage most likely occurs at the piping of the refrigerant circuit, the distance between the possible leakage position and the refrigerant gas sensor is too large and too many obstacles are located between, so that a reliable detection of a refrigerant leakage without running the indoor fan continuously is not possible.

Accordingly, when the indoor fan is stopped because of reaching the required room temperature, the leaked refrigerant does not get detected due to the distance of the attained outlet of the leaked refrigerant and the refrigerant sensor. Hence, in order to overcome said phenomenon, EP 3 279 590 A1 teaches to perform a sampling operation to drive the indoor fan in order to detect refrigerant leakage. Hence, the indoor fan is operated even an air-conditioning operation is not needed in expense of user comfort and increased energy consumption. Finally, in case of any mechanical problem resulting in stopping the indoor fan to function, the detection of leaked refrigerant is jeopardized.

PATENT LITERATURE

[PTL 1] EP 3 279 590 A1
[PTL 2] EP 2 813 777 A1
[PTL 3] JP 2012-77952 A

SUMMARY

In view of the above, there is the desire to provide a ceiling-mounted air conditioning indoor unit for a heat pump comprising a refrigerant circuit capable of providing a high detection efficiency/accuracy and high detection reliability, while avoiding continuous running of an indoor fan of the indoor unit, thereby reducing energy consumption of the indoor unit.

This aim may be achieved by a ceiling-mounted air conditioning indoor unit for a heat pump comprising a refrigerant circuit as defined in claim 1. Embodiments may be found in the dependent claims, the following description and the accompanying drawings.

According to one or more embodiments of the present disclosure, a ceiling-mounted air conditioning indoor unit for a heat pump comprising a refrigerant circuit, the indoor unit comprising: a casing comprising an air inlet and at least one air outlet; a drain pan in a bottom portion of the casing, the drain pan having a first rim (outer circumferential rim) and an second rim (inner circumferential rim), a heat exchanger being part of the refrigerant circuit and arranged above the drain pan so that water dropping from the heat exchanger accumulates in the drain pan, a fan accommodated in the casing to draw air in the air inlet through the heat exchanger and out of the at least one air outlet, a bell mouth located at the air inlet for guiding drawn in air to the fan, a refrigerant leakage detection sensor for detecting refrigerant leaking from the refrigerant circuit. The refrigerant leakage detection sensor is positioned between an outer surface of the second rim of the drain pan and an inner surface of the bell mouth, wherein the outer surface of the second rim of the drain pan and the inner surface of the bell mouth face each other.

In this way a ceiling-mounted air conditioning indoor unit can be provided, capable of providing an improved detection efficiency/accuracy and detection reliability. This is in particularly possible, since the refrigerant gas sensor is provided on the side of the bell mouth, on which leakage of refrigerant usually occurs, namely on the side of the refrigerant circuit.

Moreover, as the refrigerant leakage detection sensor is located on the bell mouth, the sensor can be easily accessed from the outside of the indoor unit through the bell mouth, thereby reducing maintenance costs.

There are different types of ceiling-mounted air conditioning indoor units, for example, indoor units included in the present disclosure can have for example two air outlets or four air outlets. The types of indoor units differ not only with regard to the number of outlets, but also for example with regard to the design or position of the outlets.

For example, EP 2 813 777 A1 describes an indoor unit of a ceiling suspension type set to be suspended from a ceiling surface T (see FIG. 11). The indoor unit includes a casing having a rectangular parallelepiped shape, a heat exchanger annularly arranged in the casing, a fan set on the inner side of the heat exchanger, and a drain pan provided below the heat exchanger.

The casing has a rectangular shape in bottom view. The casing includes a decorative plate including a suction grille, a top plate, four corner covers located between the decorative plate and the top plate, four upper decorative frames extending in the horizontal direction among the corner covers adjacent to one another, and four lower decorative frames extending in the horizontal direction among the corner covers adjacent to one another.

A filter is arranged between the suction grille and the fan. Air outlets are respectively provided in four sidewalls of the casing. The upper decorative frames are provided above the air outlets corresponding thereto. The lower decorative frames are provided below the air outlets corresponding thereto. Heat insulators are arranged on the inner sides of the upper decorative frames along the upper decorative frames and the top plate continuing to the upper decorative frames.

As the heat exchanger, for example, a cross fin type can be used in which a large number of tabular fins are attached to a plurality of heat transfer pipes, which are arranged in parallel to one another, in an orthogonal state. However, the heat exchanger is not limited to this. The heat exchanger functions as an evaporator during a cooling operation and functions as a condenser during a warming operation.

The drain pan collects drain water generated in the heat exchanger. The drain pan is formed of foamed resin such as foamed polystyrene. The drain pan includes a storing section located right under the heat exchanger and capable of temporarily storing the drain water and a side end located further on the air outlets side than the storing section and forming a part of lower edge sections of the air outlets. The side end is provided on the inner side (upper side) of the lower decorative frame.

As the fan, for example, a centrifugal fan (a turbo fan), a diagonal flow fan, or the like can be used. The fan includes an impeller including a circular hub, a circular shroud including an air introducing opening in the center, and a plurality of blades retained between the hub and the shroud. A rotating shaft of a fan motor is connected to the hub of the fan. On the lower side of the shroud, a bell mouth for guiding the indoor air to the fan is provided. The bell mouth includes, in the center, an opening slightly smaller than the opening of the shroud. When the impeller of the fan rotates, the air in the room is sucked into the casing from the suction grille of the decorative plate and, after passing through the heat exchanger, blown out to sides from the air outlets.

The air outlets are opening sections, the shape and the size of which are marked out by members that form the casing. Specifically, the air outlets are substantially rectangular opening sections marked out by the corner covers located on both sides of the air outlets, the upper decorative frame, and the lower decorative frame. The air outlets have a laterally long shape, an opening dimension in the horizontal direction of which is longer than an opening dimension in the up-down direction. Louvers that adjust a blowing-out direction of the air are provided in the air outlets.

Moreover, JP 2012-77952 A describes an indoor unit with two air outlets (see also FIG. 12). A bottom plate includes a decorative sheet which is located under a filter and arranged nearly horizontally. A suction port of the indoor unit extends along the edge of the decorative sheet at a position out of the center of an inlet port. Moreover, a guide member is provided in a suction passage wherein air sucked from the suction port runs toward the filter, so as to guide the air sucked from the suction port to a region on the central side of the inlet port in the filter.

According to one or more embodiments of the present disclosure, a manifold is provided fluidly connecting refrigerant pipes of the heat exchanger at a first end of the heat exchanger to the refrigerant circuit, and wherein the refrigerant leakage detection sensor is arranged adjacent the first end and the manifold.

Moreover, the heat exchanger may circumferentially surround the inlet opening and may have a second end opposite to the first end, wherein the first end and the second end are directed towards each other, wherein the refrigerant leakage detection sensor may be arranged adjacent the first end and second end of the heat exchanger.

In this way it become possible to provide the refrigerant leakage detection sensor in the vicinity of the refrigerant circuit, in particular in the vicinity of the most likely locations of refrigerant leakage, thereby eliminating possible obstacles between the refrigerant leakage detection sensor and the possible location(s) of refrigerant leakage that could interfere with the refrigerant leakage detection. Thereby, ensuring reliability of the refrigerant leakage detection sensor.

Furthermore, the refrigerant leakage detection sensor may be a gas sensor having a housing and a refrigerant reception area at an end of the housing allowing gaseous refrigerant to enter the housing, wherein the refrigerant reception area is located below a top of the second rim of the drain pan and/or a top of the inner surface of the bell mouth.

In this way, the condensed water accumulated in the drain pan automatically starts draining before the water level approaches to overflow towards the refrigerant leakage detection sensor. Thereby, the sensor can be protected against contact with condensed water.

The term "refrigerant reception area" concerning the "gas sensor" defines in the present disclosure that the housing of the gas sensor, in particular the end or top of the housing is provided with an area or surface that allows refrigerant, in particular gaseous refrigerant, to penetrate the reception area and thereby enter the housing of the gas sensor. In this way the refrigerant reception area makes it possible that on one hand gaseous refrigerant can enter the housing and thereby reach the sensing element arranged inside the housing, on the other hand the refrigerant reception area prevents moisture and water, in particular condensed water, to enter the housing. In other words, the refrigerant reception area, which may be a membrane, is impermeable to liquids like moisture and water but permeable to air. Alternatively, the refrigerant reception area could include an upper layer made of a silica filter and a lower layer made of active charcoal.

Additionally, the refrigerant leakage detection sensor may further comprise a sensor casing; a circuit board enclosed by the sensor casing, wherein the gas sensor may be mounted on the circuit board and further may have a sensing element in the housing, wherein the housing protrudes through an opening in the sensor casing so that the refrigerant reception area is arranged outside the sensor casing and the sensing element is positioned inside the sensor casing.

The term "sensor element" defines in the present disclosure any means that is able to detect a physical parameter like temperature, pressure or humidity, particularly the existence of a gaseous refrigerant (gas sensor).

According to one or more embodiments of the present disclosure, the sensor casing may have a mounting surface mounted to the bell mouth, wherein the opening is provided in a bottom wall of the casing facing the mounting surface and the housing of the gas sensor protrudes toward the mounting surface.

In the ceiling-mounted air conditioning indoor unit the sensor casing may comprise legs connecting the sensor casing to the mounting surface, whereby a passage having opposite open ends is formed between the legs, the bottom wall and the bell mouth.

Moreover, a first portion of the bottom wall having the opening may be arranged further away from the mounting surface than a second portion of the bottom wall, wherein the first portion of the first wall and the second portion of the first wall may be connected by an inclined surface.

In this way it become possible to provide a sensor casing having a passage or space through which the surround air of the sensor casing can easily flow, particularly flow by the refrigerant reception are of the gas sensor. Accordingly, gaseous refrigerant can move more freely around the sensor casing and get easier in contact with the gas sensor. Hence, a faster and more efficient detection of leaked refrigerant can be achieved.

Additionally, the refrigerant leakage detection sensor may be positioned with the first portion facing the inner surface of the bell mouth.

Positioning of the refrigerant leakage detection sensor at the bottom part of the bell mouth inner wall, which facilitates detection of the refrigerant having a higher density than air and travelling through the lower part of the indoor unit.

According to one or more embodiments of the present disclosure, a through hole may be provided in a wall of the sensor casing facing the outer surface of the second rim of the drain pan and an isolated electrical cable electrically connected to the gas sensor may be passed through the through hole in the wall, in particular in a sealed manner.

The ceiling-mounted air conditioning indoor unit may further comprise an electrical box, wherein the refrigerant leakage detection sensor is electrically connected to a component in the electrical box via a sensor cable.

Moreover, the casing may have four side walls and the electrical box may be positioned on an outer side of one of the side walls and the refrigerant leakage detection sensor may be positioned close to an inner side of the side wall that the electrical box is positioned.

According to one or more embodiments of the present disclosure, the drain pan may have an air inlet side surface and the sensor cable connecting the refrigerant leakage detection sensor and the component in the electrical box may run from the refrigerant leakage detection sensor to the air inlet side surface of the drain pan, along the air inlet side surface of the drain pan and to the component in the electrical box.

Furthermore, a groove may be provided in the air inlet side surface of the drain pan extending from the second rim of the drain pan to the first rim of the drain pan and the sensor cable may be accommodated in the groove.

Moreover, a sealing may be provided in an extended groove between the bell mouth and drain pan in order to avoid an inappropriate function (false suction).

As the sensor cable is accommodated in the groove, it becomes possible to spare space below the drain pan, thereby reducing the size of the indoor unit. Moreover, as the sensor cable lies within the groove, it is protected against damage during installation work.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

DETAILED DESCRIPTION

Several embodiments of the present disclosure will now be explained with reference to the drawings. It will be apparent to those skilled in the field of air-conditioning apparatus from this disclosure that the following description of the embodiments is provided for illustration only and not for the purpose of limiting the disclosure as defined by the appended claims.

Figure 1:
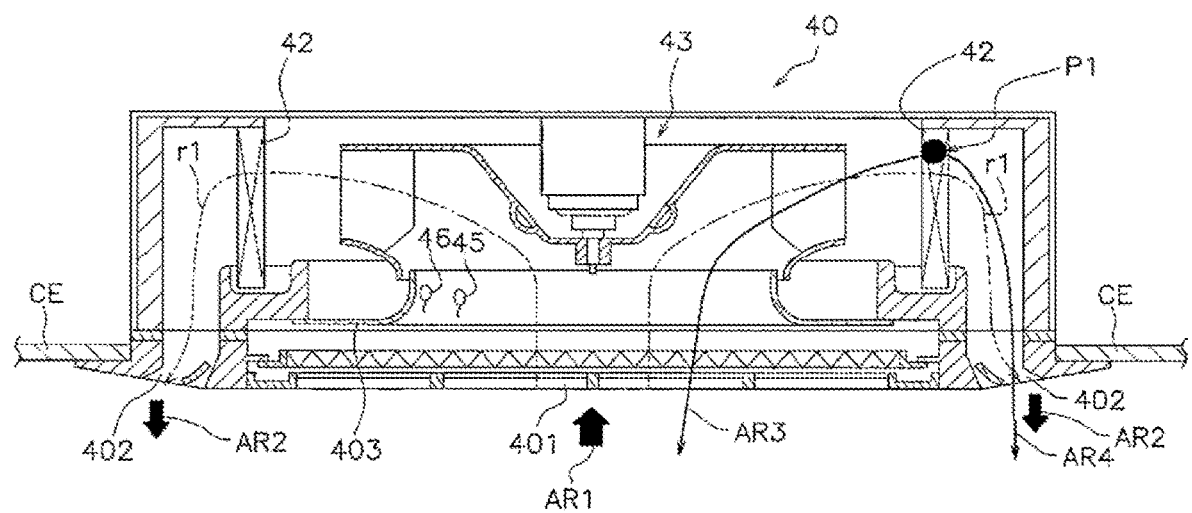
FIG. 1 is a schematic cross-sectional view illustrating a conventional ceiling-mounted air conditioning indoor unit having a refrigerant leakage detection sensor.

FIG. 1 is a schematic illustration showing a cross-sectional view of a conventional ceiling-mounted air conditioning indoor unit having a refrigerant leakage detection sensor. The shown indoor unit 40 is a ceiling-mounted indoor unit mounted by being, e.g. embedded in or suspended from a ceiling CE in a room of, e.g., an office building or another type of building.

As shown in FIG. 1, a conventional ceiling-mounted air conditioning indoor unit includes an indoor heat exchanger 42 serving as a usage-side heat exchanger for cooling an indoor space during a cooling operation, an indoor fan 43 serving as an air blower for drawing indoor air into the indoor unit 40, wherein the indoor fan 43 can be a turbofan, a bell mouth 403, an intake temperature sensor 46 and a refrigerant gas sensor 45 detecting leaked gas refrigerant when the refrigerant circulating through the indoor-side refrigerant circuit has leaked out to the atmosphere. Moreover, a conventional ceiling-mounted air conditioning indoor unit as shown in FIG. 1 has the shape of a square, when seen from below, and includes four blow-out ports 402, which are provided along the four sides of the square, and the indoor heat exchangers 42 are also disposed along the four sides of the square. For example, in the case in which the refrigerant gas sensor 45 is attached near the left of the intake port 401, when leakage occurs in point P1 extending along the right side of the indoor heat exchanger 42 and the indoor fan 43 is stopped, leaked refrigerant gas flows in, e.g. the path of arrow AR3. Thus, when the leaked refrigerant gas flows through a spot far from where the refrigerant gas sensor 45 is attached, it is difficult for the refrigerant gas sensor 45 to detect the leaked refrigerant. While the indoor fan 43 is driven, air flows as shown by double-dash line r1, and the refrigerant leaked out from point P1 is therefore caught up in the airflow, and blown out from the blowout port 402 through a path shown by arrow AR4. Hence, as the position of the refrigerant gas sensor 45 does not necessarily coincide with the flow path of the leaked refrigerant, the reliability of the leaked refrigerant detection is low.

Figure 2:
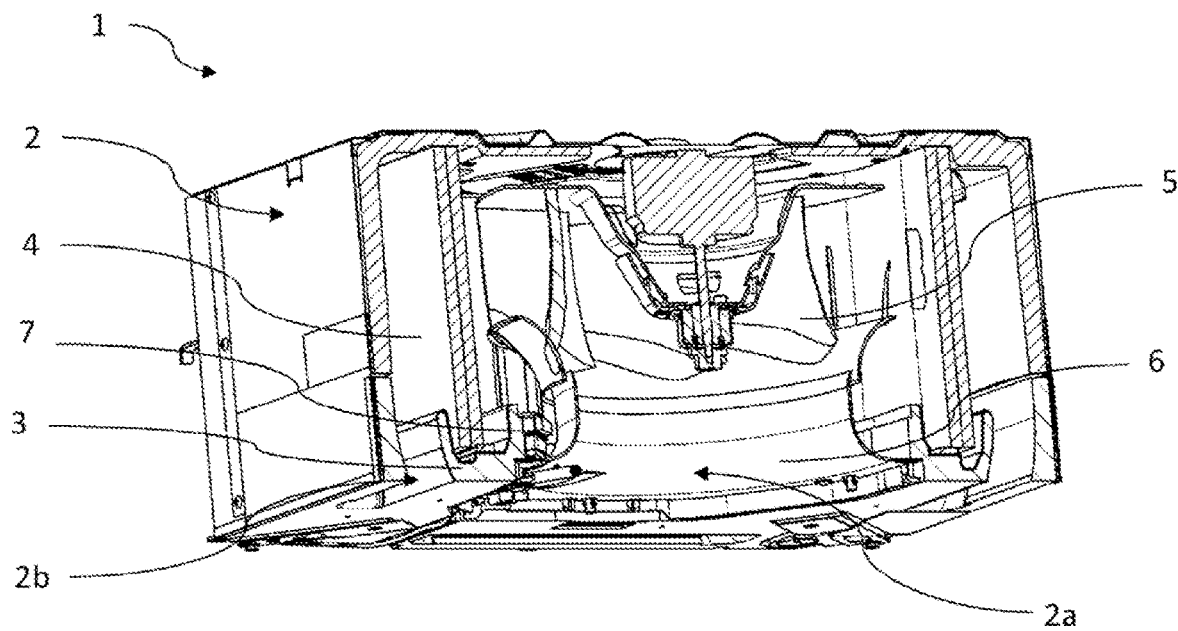
FIG. 2 is a schematic three-dimensional cross-sectional view illustrating a ceiling-mounted air conditioning indoor unit according to one or more embodiments of the present disclosure.

FIG. 2 is a schematic three-dimensional cross-sectional view illustrating a ceiling-mounted air conditioning indoor unit 1 according to one or more embodiments of the present disclosure. As shown in FIG. 2, the ceiling-mounted air conditioning unit 1 for a heat pump comprising a refrigerant circuit, through which a refrigerant, which may have a greater specific gravity when gasified than air, flows, includes a casing 2 having one air inlet 2a and four air outlets 2b, a drain pan 3, having an outer circumferential rim (first rim) 3a and an inner circumferential rim (second rim) 3b. The indoor unit 1 further includes a heat exchanger 4 being part of the refrigerant circuit and arranged above the drain pain 3 when seen in FIG. 2, which shows the ceiling-mounted air conditioning unit in its mounting position. As the drain pain 3 is arranged below the heat exchanger 4, condensed water dropping from the heat exchanger 4 is accumulated in the drain pan 3. Additionally, the indoor unit 1 includes a fan 5 provided inside the casing 2 and operated to draw indoor air, in particular air that should be air-conditioned, through the air inlet 2a into the casing 2, pass the air through the heat exchanger 3 in order to exchange heat between the air and the heat exchanger 3 and blow the air out of the four air outlets 2b. The indoor unit 1 further includes a bell mouth located above the air inlet 2a, or forming at least part of the air inlet, and guiding the air drawn in by the fan 5 to the fan. Moreover, the indoor unit 1 includes a refrigerant leakage detection sensor 7 for detecting refrigerant leaking from the refrigerant circuit. As can be taken from FIG. 2, and in more detail from FIGS. 3 and 4, the refrigerant leakage detection sensor 7 is located between an outer surface 8 of the inner circumferential rim 3b of the drain pan 3 and an inner surface 9 of the bell mouth 6.

Figure 3:
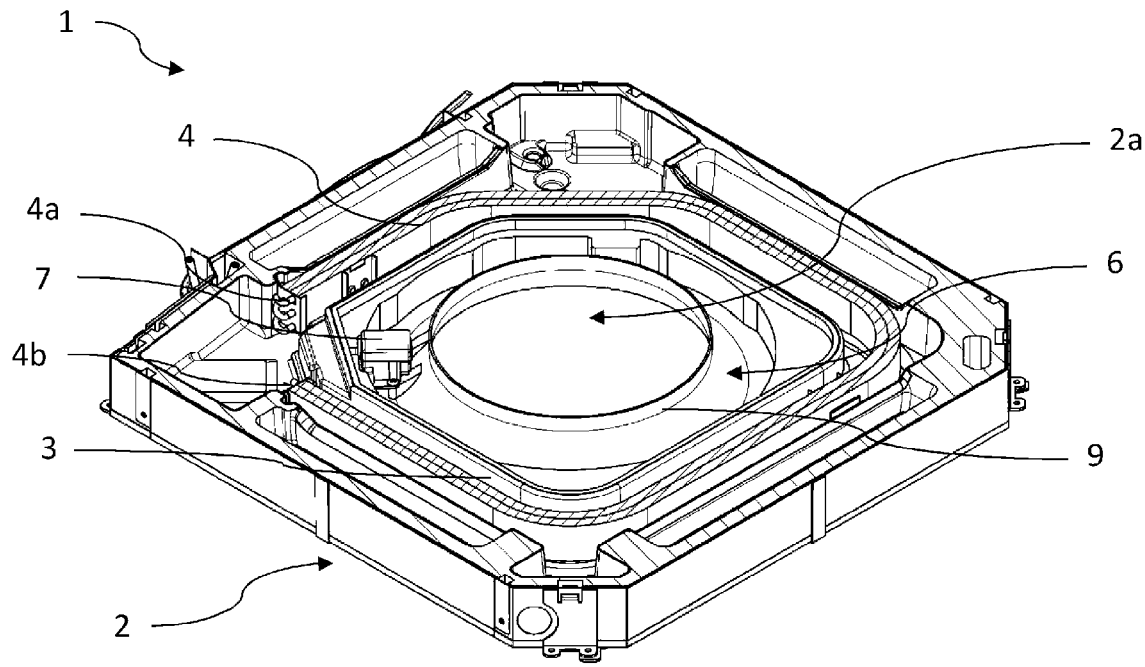
FIG. 3 is a schematic three-dimensional view illustrating the position of the leakage detection sensor within the ceiling-mounted air conditioning indoor unit shown in FIG. 2.

FIG. 3 is a schematic three-dimensional view illustrating the position of the leakage detection sensor 7 within the ceiling-mounted air conditioning indoor unit 1 shown in FIG. 2. In order to better illustrate the position of the refrigerant leakage detection sensor 7 within the indoor unit 1, the sectional plane is chosen in such a way that only the bottom part of the indoor unit 1 is shown, in particular the drain pan 3 and the bell mouth 6.

FIG. 3 also shows that the heat exchanger 4 has a first end 4a and a second end 4b, where a manifold (not shown) fluidly connects refrigerant pipes of the heat exchanger 4 with the refrigerant circuit. The first end 4a and the second end 4a are directed towards each other and are arranged perpendicular to each other. The refrigerant leakage detection sensor 7 is arranged adjacent to the first end 4a and the second end 4b of the heat exchanger 4 and the manifold.

Figure 4:
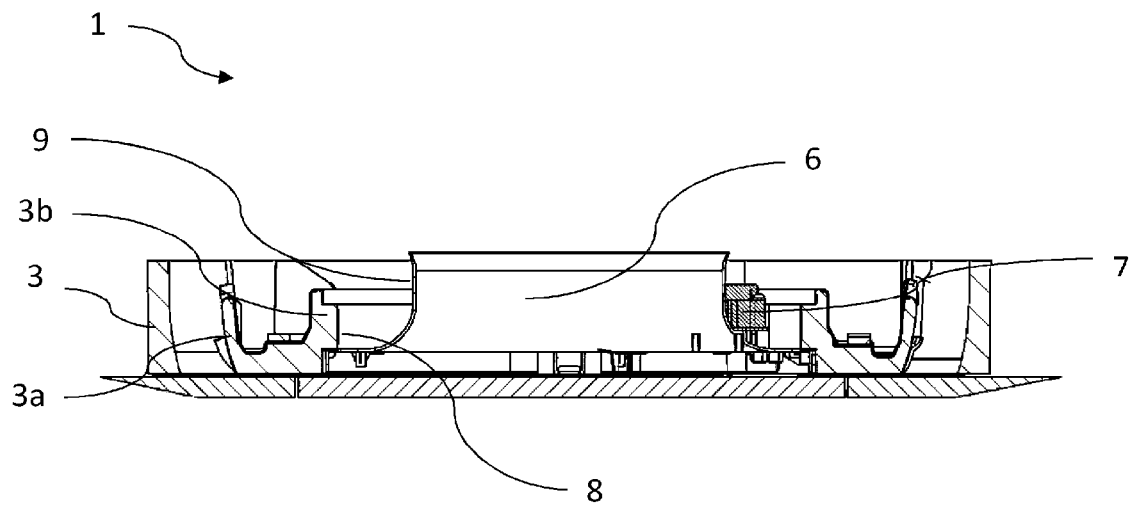
FIG. 4 is a schematic cross-sectional view illustrating the leakage detection sensor within the ceiling-mounted air conditioning indoor unit shown in FIGS. 2 and 3.

FIG. 4 is a schematic cross-sectional view illustrating the leakage detection sensor within the ceiling-mounted air conditioning indoor unit shown in FIGS. 2 and 3. For easier orientation, FIG. 4 shows the same bottom part of the indoor unit as FIG. 3. In FIG. 4 the refrigerant leakage detection sensor 7 is shown on the right side of the bell mouth 6. As can be seen in FIG. 4, the refrigerant leakage detection sensor 7 is positioned between the outer surface 8 of the inner circumferential rim 3b of the drain pan and the inner surface 9 of the bell mouth 6. Here, the inner surface 9 of the bell mouth 6 faces the inner side of the casing 2. In other words, faces away from the air inlet 2a. FIG. 4 also illustrates that the outer surface 8 of the inner circumferential rim 3b of the drain pan 3 faces the inner surface 9 of the bell mouth 6.

FIG. 4 also shows that a refrigerant reception area of the refrigerant detection sensor 7, which is located at an end of a housing of the refrigerant detection sensor 7 and allows gaseous refrigerant to enter the housing, is located below a top of the inner circumferential rim 3b of the drain pan 3 and/or a top of the inner surface 9 of the bell mouth 6. Moreover, as shown in FIG. 4, the refrigerant leakage detection sensor 7 is positioned with a first portion (which will be explained in more detail with reference to FIGS. 5 to 7) facing the inner surface 9 of the bell mouth 6.

Figure 5:
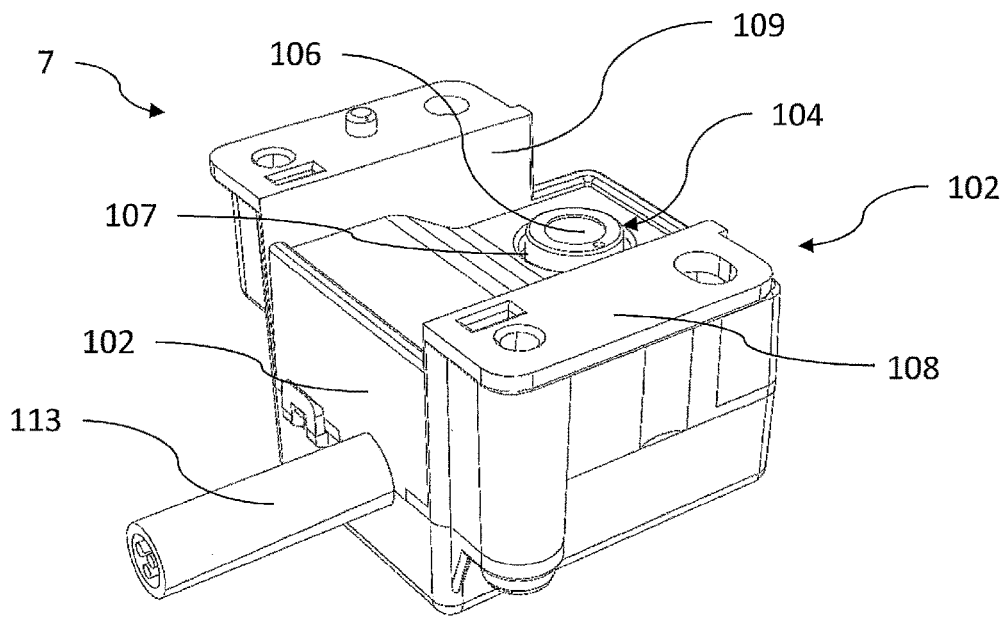
FIG. 5 is a schematic three-dimensional view illustrating a refrigerant leakage detection sensor according to one or more embodiments of the present disclosure.

FIG. 5 is a schematic three-dimensional illustration of a refrigerant leakage detection sensor 7 according to one or more embodiments of the present disclosure. As FIG. 5 shows, the refrigerant leakage detection sensor 7 includes a sensor casing 102, a circuit board 103 (shown in FIG. 6) and a gas sensor 104. The gas sensor 104 has a housing 105, which can be seen in more detail in FIG. 6, and a refrigerant reception area 106, which is located at the end of the housing 105, e.g. on the top of the housing 105. The refrigerant reception area 106 is configured to allow gaseous refrigerant to enter the housing 105. In this way, it is possible that gaseous refrigerant enters the housing 105 and thereby reaches a sensing element (not shown) which is located inside the housing 105.

As can also be taken from FIG. 5, the gas sensor 104, in particular the housing 105 is protruding through an opening 107 arranged in the sensor casing 102 in such a manner that the refrigerant reception area 106 is arranged outside the sensor casing 102. On the other hand, the sensing element (not shown), which is located inside the housing 105, is positioned inside the sensor casing 102.

Moreover, in order to better show the location of the gas sensor 104 within the sensor casing 102, the refrigerant leakage detection sensor 7 is shown in FIG. 5 upside down. Meaning, a mounting surface 108 that is used for mounting the sensor casing 102 to an external structural element, in particular the bell mouth 6, is shown on top of the sensor casing 102. However, generally, the mounting surface 108 is positioned below the sensor casing 102. In other words, in a usual mounting situation of the refrigerant leakage detection sensor 7, the sensor is rotated by 180 degrees, as shown in FIG. 6.

Figure 6:
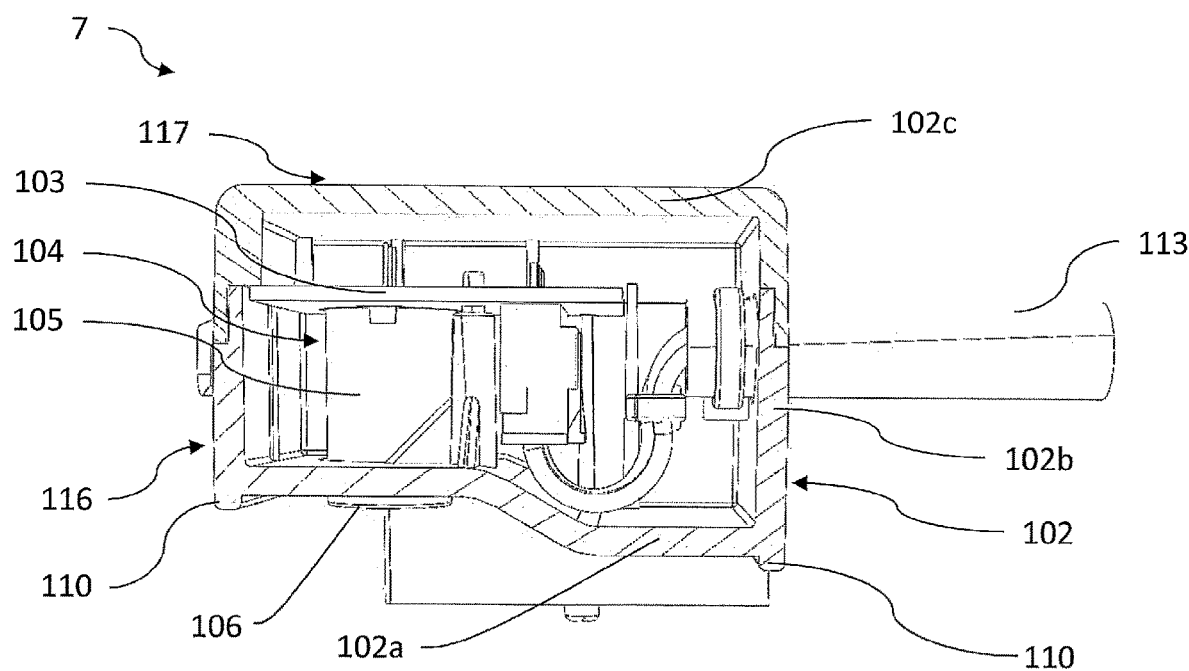
FIG. 6 is a schematic sectional view of the refrigerant leakage detection sensor shown in FIG. 5.

FIG. 6 is a schematic sectional view of the refrigerant leakage detection sensor 7 shown in FIG. 5. By providing a sectional view of the sensor 7, it becomes possible to see the arrangement of the gas sensor 104 and related elements within the sensor casing 102. As shown in FIG. 3, the sensor casing 102 comprises a body 116, which is in the standard mounting position of the sensor the lower part of the sensor casing 102, and a lid 117. The lid 117 is detachably fixed to the body 116, wherein mating surfaces of the body 116 and the lid 117 overlap in a direction perpendicular to a fixation direction. In FIG. 6, the fixation direction is vertical, hence, the mating surfaces of the body 116 and the lid 117 overlap in the horizontal plane.

In the refrigerant detection sensor 7 shown in FIG. 6, the mating surface of the lid 117 is arranged outside of the mating surface of the body 116, meaning the mating surface of the lid 117 surrounds the mating surface of the body 116, in particular over the entire outer circumference.

A circuit board 103 of the gas sensor 104 is arranged inside the sensor casing 102 and parallel to a first wall 102a of the sensor casing 102, in particular a part of the first wall 102a which is most far away from the circuit board 103 and parallel to the mounting surface 108. In the standard mounting position of the sensor 7 shown in FIG. 6, the first wall 102a is a bottom wall of the sensor casing 102 and is located on the side of the mounting surface 108. The first wall 2a is provided with an opening 107, through which the housing 105 of the gas sensor 104 protrudes toward the mounting surface 8.

Figure 7:
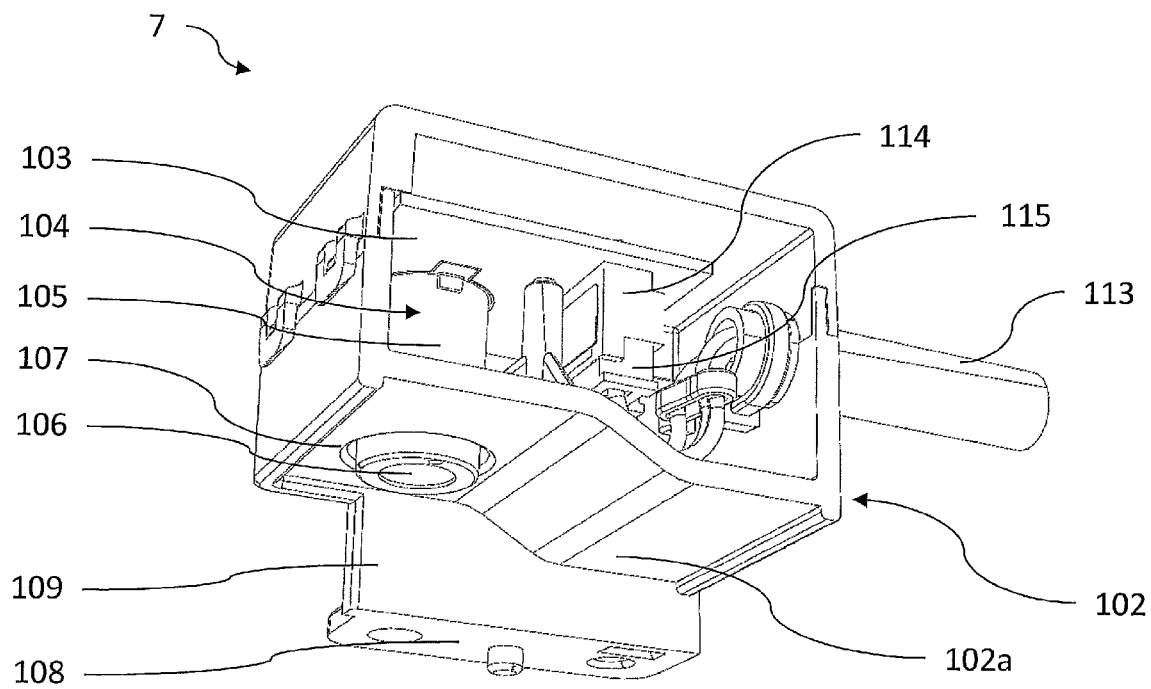
FIG. 7 is a schematic three-dimensional illustration of the sectional view shown in FIG. 6.

Moreover, as shown in FIGS. 5 and 7, the sensor casing 102 is provided with two legs 109 connecting the sensor casing 102 with the mounting surface 108. In other words, the mounting surface(s) 108 is/are provided at the end surface of the legs 109. The legs 109 are arranged in such a manner that between the two legs 109 and the first wall 102a a passage having opposite open ends is formed.

As can also be taken from FIGS. 6 and 7, the sensor casing 102, in particular the body 116, is provided at a free edge of the outer circumference of the first wall 102a, which is part of the body 116, with a lip 110. The lip 110 is formed in such a way that it protrudes toward the mounting surface 108.

FIG. 6 also shows that the circuit board 103 is arranged in the sensor casing 102 parallel to the first wall 102a, in particular a part of the first wall 102a which is most far away from the circuit board 103 and parallel to the mounting surface 108, and further away from the first wall 102a than from a third wall 102c, which is in standard mounting position of the sensor 7 shown in FIG. 6 a top wall, opposite to the first wall 102a.

FIG. 7 is a schematic three-dimensional illustration of the sectional view shown in FIG. 6. As can be taken from FIG. 7 (and also FIG. 6), a first portion of the first wall 102a, in FIG. 7 the left portion of the first wall 102a, is arranged further away from the mounting surface 108 than a second portion of the first wall 102a, in FIG. 7 the right portion of the first wall 102a. Accordingly, the overall height of the sensor casing 102 is reduced on the side of the sensor casing 102, where the gas sensor 103 is located. As also shown in FIG. 7, the first portion of the first wall 102a and the second portion of the first wall 102a are connected by an inclined surface, which is accordingly arranged in the middle of the first wall 102a.

The sensor casing 102 of the refrigerant detection sensor 7 shown in FIGS. 5 to 7 is also provided with a through hole 112, which is located in a second wall 102b of the sensor casing 102, which is a side wall of the sensor casing 102. The through hole 112 is needed for passing an isolated electrical cable 113 into the sensor casing 102. In one or more embodiments shown in FIGS. 5 to 7, the isolated electrical cable 113 is provided at the one end, which is located inside the sensor casing 102, with a plug 115 that is insertable into a socket 114, which is mounted on the circuit board 3, so that the isolated electrical cable 113 can be connected to the circuit board 103.

Figure 8:
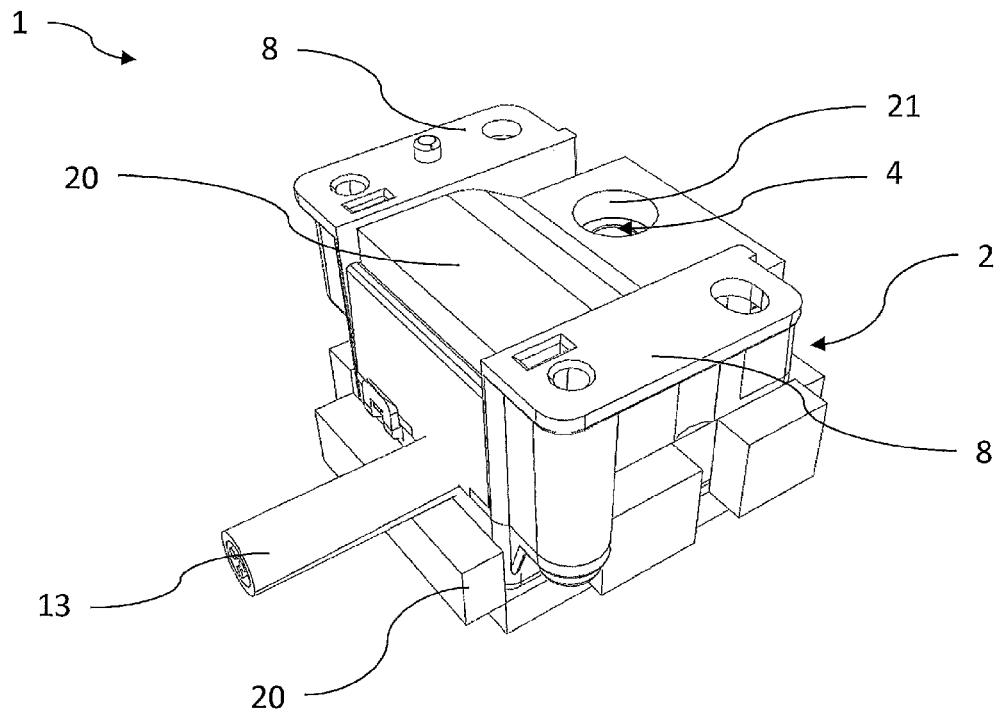
FIG. 8 is a schematic three-dimensional illustration of a refrigerant leakage detection sensor according to one or more embodiments of the present disclosure.

FIG. 8 is a schematic three-dimensional illustration of a refrigerant leakage detection sensor 1 according to one or more embodiments of the present disclosure. The shown refrigerant leakage detection sensor 1 basically corresponds to the refrigerant leakage detection sensor 1 described with regard to FIGS. 5 to 7, except that the in FIG. 8 shown sensor 1 additionally is provided with an insulation member 20, which partially thermally insulates the sensor casing 2.

The insulation member 20 is provided with an opening 21, through which the housing 5 of the gas sensor 4 partially protrudes. In the shown embodiments the housing 5 may protrude through the opening 21 in a sealed manner, making it possible that the housing 5 can protrude through the opening 7 of the sensor casing 2 with clearance, in particular in a not sealed manner. The sealing between the insulation member 20 and the housing 5 of the gas sensor 4 can be achieved by a press-fitting, which is particularly advantageous or easy to realize in case the insulation member 20 is made of an elastic material like polyethylene foam.

Figure 9:
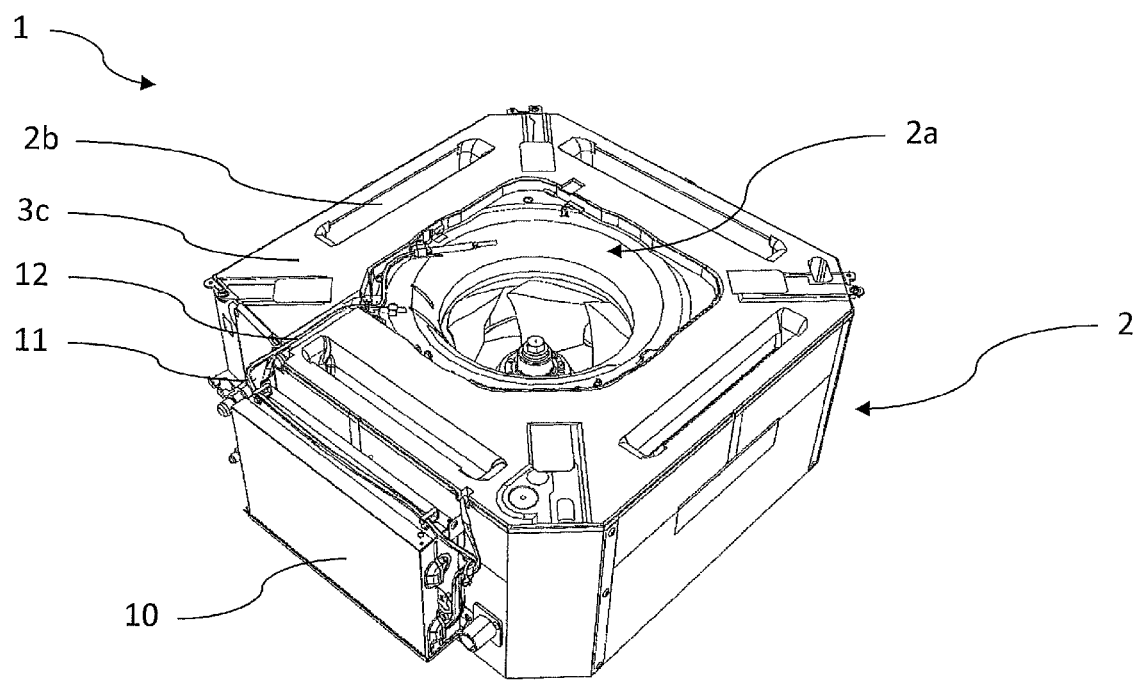
FIG. 9 is a schematic three-dimensional view illustrating the electric cable of the leakage detection sensor according to one or more embodiments of the present disclosure.

FIG. 9 is a schematic three-dimensional view illustrating the electric cable 11 of the leakage detection sensor 7 according to one or more embodiments of the present disclosure. As shown in FIG. 9, the indoor unit 1 includes an electrical box 10, in which for example a control unit of the indoor unit 1 can be accommodated, wherein the refrigerant leakage detection sensor 7 is electrically connected to a component, for example the control unit, inside the electrical box 10 via a sensor cable 11. The sensor cable 11 can be an isolated electrical cable.

The electrical box 10 is provided on one outer side of four side walls of the casing 2 of the indoor unit 1 and the refrigerant leakage detection sensor 7 is positioned close to an inner side of the side wall at which the electrical box 10 is positioned. In this way the necessary length of the sensor cable 11 can be reduced to a minimum.

As FIG. 9 also shows, the drain pan 3 has an air inlet side surface 3c, which is facing upside in FIG. 9 for illustrative purposes. The sensor cable 11 connecting the refrigerant leakage detection sensor 7 and the component in the electrical box 10 runs from the refrigerant leakage detection sensor 7 to the air inlet side surface 3c of the drain pan 3, along the air inlet side surface 3c of the drain pan 3 and to the component in the electrical box 10. For this purpose, the air inlet side surface 3c of the drain pan 3 is provided with a groove 12, extending from the inner circumferential rim 3b of the drain pan 3 to the outer circumferential rim 3a thereof, and the sensor cable 11 is accommodated inside the groove 12.

Figure 10:
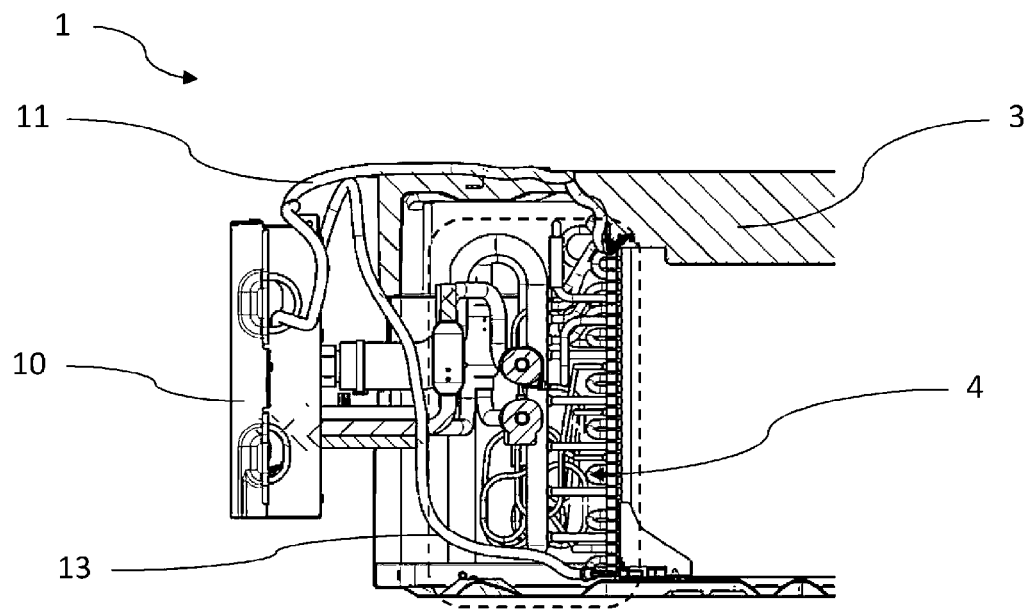
FIG. 10 is a schematic cross-sectional view illustrating the routing of the electric cable of the leakage detection sensor according to one or more embodiments shown in FIG. 9.

FIG. 10 is a schematic cross-sectional view illustrating the routing of the electric cable or sensor cable 11 of the leakage detection sensor 7 according to one or more embodiments shown in FIG. 9.

As can be seen in FIGS. 9 and 10, the groove 12 provided in the drain pan 3 connects the inner and outer perimeters of the drain pan 3. Since the sensor cable 11 is accommodated within the groove 12, space above the drain pan can be spared, reducing the overall height of the indoor unit.

FIG. 10 also indicates by a dotted line the area where conventionally electric cables 13 are located, in this area the cable is easily damaged due to sharp edges and high temperatures from the pipes of the heat exchanger 4. The routing of the sensor cable 11 suggested by the present disclosure, particularly the accommodation of the sensor cable 11 within the groove 12, allows a better protection of the cable.

Figure 11:
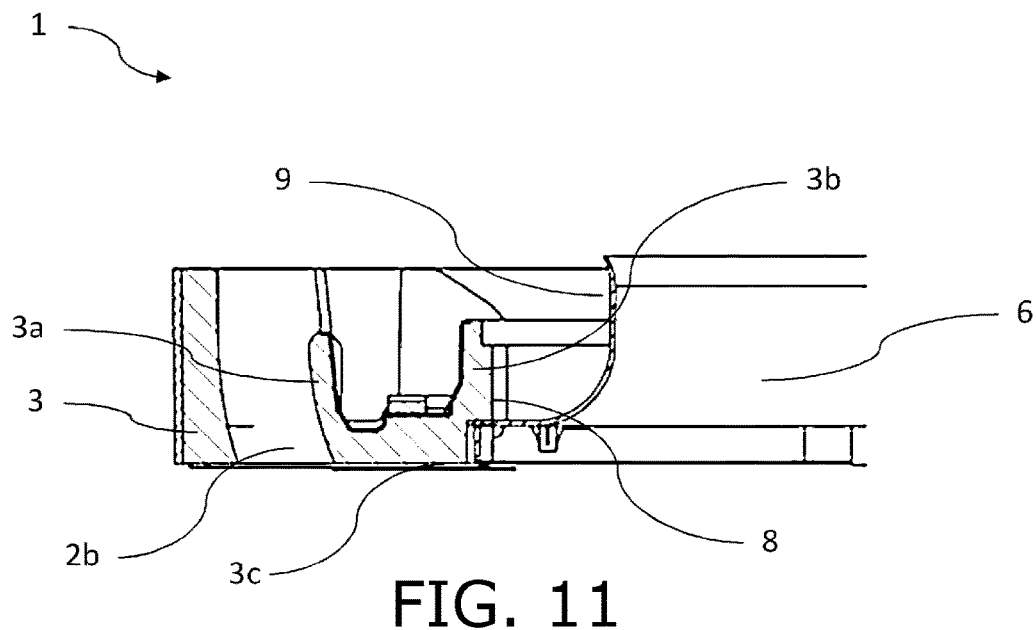
FIG. 11 is a schematic cross-sectional view illustrating the design of the drain pan and the bell mouth of according to one or more embodiments of the present disclosure in more detail.

FIG. 11 is a schematic cross-sectional view illustrating the design of the drain pan 3 and the bell mouth 6 in more detail. As shown in FIG. 11, the drain pan 3 and bell mouth 6 are designed in such a way that barriers for the water condensed on the heat exchanger are formed. The drain pan 3 is provided with a first barrier (top of the inner circumferential rim 3b), facing the bell mouth 6, and a second barrier (top of the outer circumferential rim 3a), facing the air outlet 2b. The first barrier has a height in the air intake direction which is greater than the height of the second barrier in the air intake direction. Accordingly, condensed water collected in the drain pan 3, particularly between the two barriers, flows towards the air outlet, in case of an overflow, and not towards the bell mouth 6. In this way, the refrigerant detection sensor 7 located at the bell mouth is protected from contact with condensed water.

Figure 12:
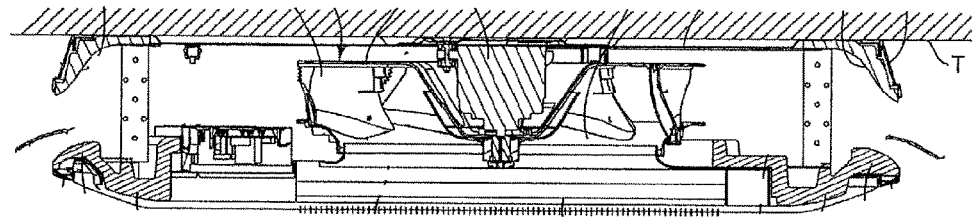
FIG. 12 is a schematic cross-sectional view illustrating a known indoor unit of a ceiling suspension type set to be suspended from a ceiling surface.
Figure 13:
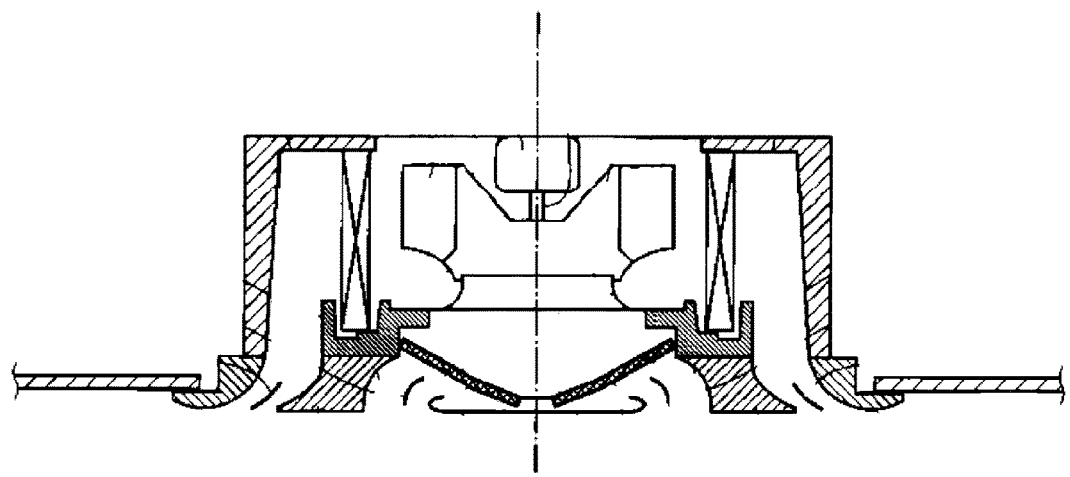
FIG. 13 is schematic cross-sectional view illustrating another known indoor unit of a ceiling suspension type, with two air outlets.

FIG. 12 is a schematic cross-sectional view illustrating a known indoor unit of a ceiling suspension type set to be suspended from a ceiling surface and FIG. 13 is schematic cross-sectional view illustrating another known indoor unit of a ceiling suspension type having two air outlets.

Although the disclosure has been described with respect to only a limited number of embodiments, those skilled in the art, having benefit of this disclosure, will appreciate that various other embodiments may be devised without departing from the scope of the present disclosure. Accordingly, the scope of the disclosure should be limited only by the attached claims.

REFERENCE SIGNS LIST

1 Ceiling-mounted air conditioning indoor unit
2 Casing
3 Drain pan
3a Outer circumferential rim
3b Inner circumferential rim
3c Air inlet side surface
4 Heat exchanger
5 Fan
6 Bell mouth
7 Refrigerant leakage detection sensor
8 Outer surface of the inner circumferential rim
9 Inner surface of the bell mouth
10 Electrical box
11 Sensor cable
12 Groove
102 Sensor casing
102a First wall (bottom wall)
102b Second wall (side wall)
102c Third wall (top wall)
103 Circuit board (PCB)
104 Gas sensor
105 Housing (of gas sensor)
106 Refrigerant reception area
107 Opening (in the sensor casing)
108 Mounting surface(s)
109 Legs
110 Lip(s)
112 Through hole (in side wall)
113 Isolated electric cable
114 Socket or plug
115 Plug or Socket
116 Body
117 Lid
120 Insulating member
121 Opening (in insulating member)

What is claimed is:

1. A ceiling-mounted air conditioning indoor unit for a heat pump comprising a refrigerant circuit, the ceiling-mounted air conditioning indoor unit comprising:
   a casing comprising an air inlet and an air outlet;
   a drain pan in a bottom portion of the casing, wherein the drain pan comprises a first rim and a second rim;
   a heat exchanger in the refrigerant circuit that is disposed above the drain pan such that water dropping from the heat exchanger accumulates in the drain pan;
   a fan in the casing that draws air in from the air inlet, through the heat exchanger, and out of the air outlet;
   a bell mouth at the air inlet that guides the air drawn-in to the fan;
   a refrigerant leakage detection sensor that detects refrigerant leaking from the refrigerant circuit, wherein
   the refrigerant leakage detection sensor is disposed between an outer surface of the second rim and an inner surface of the bell mouth that faces the outer surface of the second rim.

2. The ceiling-mounted air conditioning indoor unit according to claim 1, wherein
   a manifold fluidly connects refrigerant pipes of the heat exchanger at a first end of the heat exchanger to the refrigerant circuit, and
   the refrigerant leakage detection sensor is disposed adjacent the first end and the manifold.

3. The ceiling-mounted air conditioning indoor unit according to claim 2, wherein
   the heat exchanger circumferentially surrounds the air inlet with a second end that is opposite to the first end directing towards the first end, and
   the refrigerant leakage detection sensor is disposed adjacent the first end and the second end of the heat exchanger.

4. The ceiling-mounted air conditioning indoor unit according to claim 1, wherein
   the refrigerant leakage detection sensor comprises a gas sensor that comprises:
      a housing; and
      a refrigerant reception area at an end of the housing allowing gaseous refrigerant to enter the housing, and
   the refrigerant reception area is disposed below a top of the second rim and/or a top of the inner surface of the bell mouth.

5. The ceiling-mounted air conditioning indoor unit according to claim 4, wherein the refrigerant leakage detection sensor further comprises:
   a sensor casing;
   a circuit board that is enclosed by the sensor casing and on which the gas sensor is mounted; and
   a sensing element in the housing, wherein
   the housing protrudes through an opening in the sensor casing such that the refrigerant reception area is disposed outside the sensor casing and the sensing element is disposed inside the sensor casing.

6. A ceiling-mounted air conditioning indoor unit according to claim 5, wherein
   the sensor casing comprises a mounting surface mounted to the bell mouth,
   the opening of the sensor casing is disposed in a first wall of the sensor casing facing the mounting surface, and
   the housing of the gas sensor protrudes toward the mounting surface.

7. The ceiling-mounted air conditioning indoor unit according to claim 6, wherein the sensor casing further comprises legs connecting the sensor casing to the mounting surface such that a passage having opposite open ends and surrounded by the legs, the first wall, and the bell mouth is formed.

8. The ceiling-mounted air conditioning indoor unit according to claim 6, wherein
the opening is disposed on a first portion of the first wall that is farther away from the mounting surface than a second portion of the first wall is, and
an inclined surface connects the first portion and the second portion.

9. The ceiling-mounted air conditioning indoor unit according to claim 8, wherein the refrigerant leakage detection sensor is disposed in an orientation in which the first portion faces the inner surface of the bell mouth.

10. The ceiling-mounted air conditioning indoor unit according to claim 5, wherein a second wall of the sensor casing facing the outer surface of the second rim has a through hole through which an isolated electrical cable electrically connected to the gas sensor is passed.

11. The ceiling-mounted air conditioning indoor unit according to claim 1, further comprising:
an electrical box, wherein
the refrigerant leakage detection sensor is electrically connected to a component in the electrical box via a sensor cable.

12. The ceiling-mounted air conditioning indoor unit according to claim 11, wherein
the casing comprises four side walls,
the electrical box is disposed on an outer side of one of the four side walls, and
the refrigerant leakage detection sensor is disposed adjacent to an inner side of the one of the four side walls on which the electrical box is disposed.

13. The ceiling-mounted air conditioning indoor unit according to claim 11, wherein
the drain pan has an air inlet side surface, and
the sensor cable runs from the refrigerant leakage detection sensor to the air inlet side surface, along the air inlet side surface, and to the component.

14. The ceiling-mounted air conditioning indoor unit according to claim 13, wherein
a groove extends on the air inlet side surface from the second rim to the first rim, and
the sensor cable is disposed in the groove.

* * * * *